July 28, 1953 — O. F. BAUER — 2,646,611
GEAR CUTTER
Filed April 23, 1947
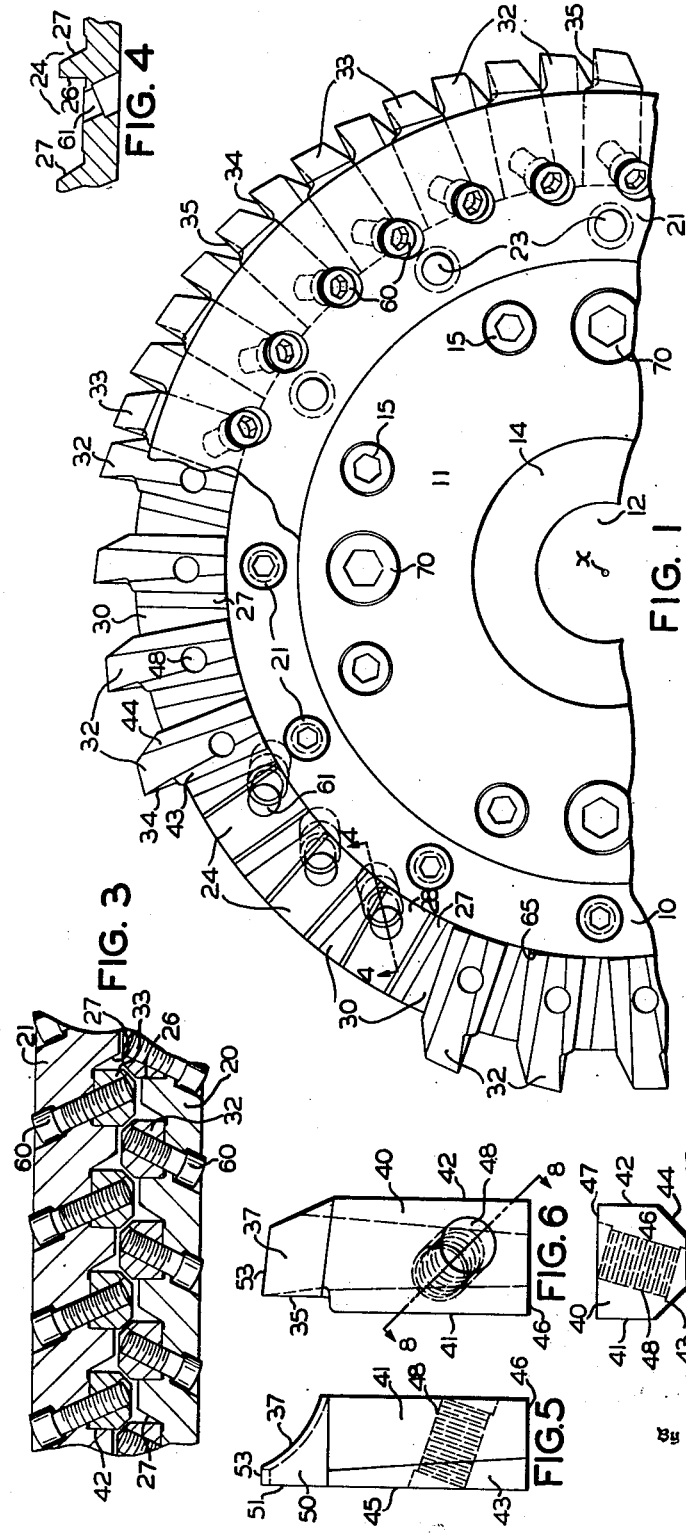
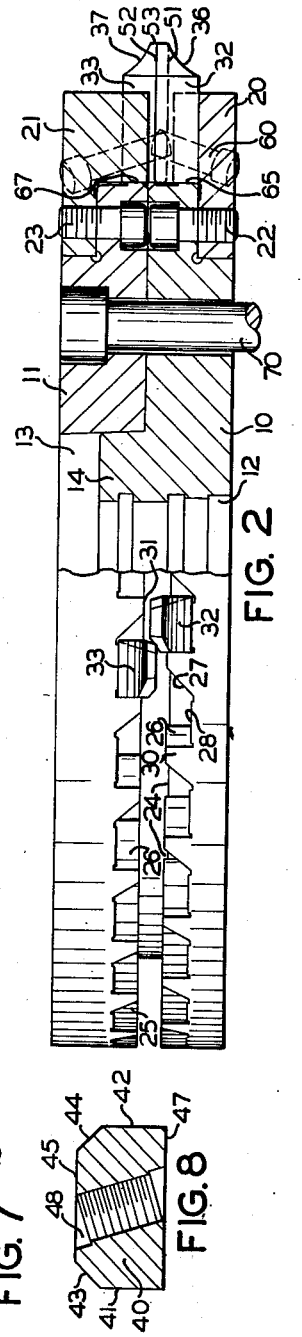
OLIVER F. BAUER Inventor
By B. E. Schlesinger
Attorney Patented July 28, 1953

2,646,611

UNITED STATES PATENT OFFICE 2,646,611

GEAR CUTTER

Oliver F. Bauer, East Rochester, N. Y., assignor to Gleason Works, Rochester, N. Y., a corporation of New York Application April 23, 1947, Serial No. 743,380

11 Claims. (Cl. 29—105)

The present invention relates to cutting tools of the inserted blade type and particularly to disc milling cutters for cutting longitudinally straight toothed gears. In a more specific aspect, the invention relates to disc milling cutters such as may be employed for cutting straight tooth bevel gears by the methods disclosed in the Wildhaber Patents Nos. 2,315,147 of March 30, 1943, 2,357,153 of August 29, 1944, and 2,376,465 of May 22, 1945.

In a conventional inserted-blade type milling cutter, the number of blades that can be mounted in the cutter head is limited not only by the size of the blade slots, but also by the width of the lands between successive blade slots. In the conventional cutter, also, each blade is secured in a slot by a screw that threads into the cutter head in a direction perpendicular to the side face of the slot against which the blade seats. In the case of a disc milling cutter, this is in the direction of the cutter axis. While each blade is made as accurately as possible to a size to fit snugly in its blade slot and to have its base seat against the bottom of the blade slot, necessary manufacturing and assembly tolerances make it difficult to secure a blade which will fit so well as to seat absolutely against the back and the bottom of its blade slot, and as a result some of the cutting thrusts, at least initially, have to be taken by the fastening screw. The blade slots of the conventional cutter have, moreover, parallel front and rear walls. This makes it difficult to grind them practically, for only one side can be ground at a time since wheel wear narrows the point-width of the wheel. As a result most conventional cutter heads are not hardened for their blade slots are not ground.

The primary object of the present invention is to provide an inserted blade type gear cutter, particularly a disc cutter, that for any given diameter will have a greater number of cutting blades than has heretofore been possible to provide.

Another object of the invention is to provide an inserted blade type gear cutter, particularly a disc cutter, in which the blades can be more rigidly held and supported against the pressure of the cut.

A further object of the invention is to provide a gear cutter of the disc milling type having inserted blades in which the blades can be sharpened a greater number of times before breaking than has heretofore been possible.

Another object of the invention is to provide an inserted blade type gear cutter, particularly a disc cutter, which can be made more accurately.

Still another object of the invention is to provide an inserted blade type gear cutter, particularly a disc cutter, which has a cutter head that may be hardened and which has blade slots that may be ground.

Other objects of the invention will be apparent hereinafter from the specification and from the recital of the appended claims.

In the drawings:

Fig. 1 is a fragmentary plan view of a disc milling center made according to a preferred embodiment of this invention, part being broken away and some of the blades of the cutter being removed to show the form of the blade slots;

Fig. 2 is a part elevational view, part diametral sectional view of this cutter, several of the blades being removed to show the shape of the blade slots;

Fig. 3 is a developed sectional view of the cutter showing how the blades are held in their respective slots;

Fig. 4 is a fragmentary sectional view on the line 4—4 of Fig. 1;

Fig. 5 is an end view, Fig. 6 a side elevation, and Fig. 7 a bottom plan view on an enlarged scale of one of the cutter blades; and Fig. 8 is a section through the blade on the line 8—8 of Fig. 6.

In a disc milling cutter made according to the preferred embodiment of this invention, there are two disc-shaped blade holders, and the blades for cutting one side of a tooth slot are mounted in one of these holders, while the blades for cutting the other side of the tooth slot are mounted in the other holder. The two holders, when assembled together, are so arranged that the slots in one holder are disposed opposite the lands between the blade slots of the other holder with the result that opposite side cutting blades alternate in the assembled cutter. Thus, practically twice as many blades can be mounted in a cutter of a given diameter made according to this invention as can be mounted in a conventional cutter. The result is that if the cutter is rotated and fed depthwise into a gear blank at the same rate as a conventional cutter, the blades will have longer life between sharpenings and approximately twice as many cuts will be taken on a tooth side per revolution of the cutter as in a conventional cutter with the result that a smoother tooth surface will be produced. A cutter made according to the present invention, however, may be rotated and fed at a considerably faster rate than a conventional cutter with the result that a gear can be cut more rapidly than heretofore without decreasing the life of the cutter or requiring more frequent sharpenings.

In the preferred embodiment of the present invention, the blades are secured in their respective slots by screws which are so threaded into the blade holders that they pull the blades simultaneously downwardly, that is radially, rearwardly, and laterally into the blade slots to firmly seat the blades against the bottoms and rear walls of the slots. Thus the blades are firmly held against cutting pressure, both tangential and radial, which means that they are much more rigidly secured than the blades of conventional cutters. This reduces materially the rapidity with which the blades might otherwise dull and also enables the blades to be sharpened much further back without danger of breakage than has heretofore been possible. It means, also, that the blade slots can be made to a shape that will require grinding of rear, side, and bottom walls only, and which will not require that the front walls be ground to secure accurate seating of the blades. This makes it practical to harden the cutter heads and grind the blade slots therein, and insures the greatest accuracy in their manufacture.

Referring now to the drawings by numerals of reference, 10 and 11 are the two discs or body members of a cutter made according to this invention. The disc 10 has a bore 12 by which the cutter may be mounted on the tool spindle of a gear cutting machine, and the disc 11 has a bore 13 which is tapered and which is adapted to fit over the hub 14 of the disc 10, whose peripheral surface is tapered correspondingly. The discs 10 and 11 have opposed plane surfaces which seat against one another and the two discs are bolted together by bolts 15.

The disc 10 has a blade holder or ring 20 secured to it by screws 22; and the disc 11 has a blade holder 21 secured to it by screws 23.

The two blade holders are provided on their adjoining opposed faces with blade receiving slots, the slots of blade holder 20 being denoted at 24, while the slots of blade holder 21 are denoted at 25. The slots of the two blade holders are alike in structure. Each has a rear wall 26, a front wall 27, and a side wall 28. All of these walls are planes. The wall 26 extends in the direction of the axis $x$ of the cutter; the wall 27 is inclined to that axis; and the wall 28 is perpendicular to that axis. The walls 26 and 27 are the same distance apart for their full length, that is, each slot 24 or 25 is of uniform width from the outer to its inner end.

Between the slots 24 of blade holder 20 are lands 30; and between the slots 25 of blade holder 21 are lands 31. The lands 30 and 31 are alike. Each decreases in width from its outer to its inner end, that is, the sides 27 and 26 of each land converge inwardly toward the axis $x$ of the cutter as required in order to accommodate the blades around the circle of the cutter.

In the embodiment of the invention shown, the blade holder 20 is adapted to carry the blades 32 for cutting one side of a tooth slot, while the blade holder 21 is adapted to carry the blades 33 for cutting the other side of the tooth slot. The blades 32 and 33 are alike except for the side rake of their front faces, the blades having opposite side rake in order to provide opposite side cutting edges 34 and 35, respectively, and except for the fact that the side cutting edges 34 and 35 and side faces 36 and 37, respectively, of the blades are oppositely inclined to a plane perpendicular to the axis of the cutter and oppositely curved.

Each blade has a shank portion 40 (Figs. 5 to 8 inclusive) whose front and rear sides 41 and 42 are parallel plane surfaces for the greater portion of the depth of the blade, but are slabbed off at their outsides to provide plane surfaces 43 and 44 which converge toward outside surface 45 and also toward the base 46 of the blade. The inside face of the blade is designated 47. Both this surface and base 46 are plane surfaces also.

The blade has a screw-receiving opening 48 in it which extends diagonally downwardly and rearwardly from the outside to the inside of the blade. This opening serves to receive the screw by which the blade is secured in its slot in the blade ring 20 or 21.

In Figs. 5 to 8 inclusive, the blade shown is one of the blades of blade ring 20 having a cutting edge 35. This edge and the outside surface 37, in which the cutting edge lies, are of curved profile shape, preferably of circular arcuate profile shape. The front face of the blade is denoted at 50 and is sharpened, as already stated, to provide the side rake which will provide the sharp cutting edge 35 at one side of the blade. The side 51 of the cutting portion of the blade, which is the non-cutting side of the blade, is a plane surface lying in the same plane as the plane 45 of the shank of the blade. The tip surface of the blade is denoted at 53. The side 37 of the blade and the tip surface 53 are relieved back of the front face 50 to provide cutting clearance, as indicated by the dotted lines in Fig. 5.

The disc or body member 10 has a cylindrical peripheral surface 65 against which the bottom surfaces 46 of the blades 32 are adapted to seat and the body member 11 has cylindrical peripheral surface 67 against which the bottom surfaces 46 of the blades 33 are adapted to seat. The peripheries of the discs are relieved so that these seating surfaces are narrower than the bases 46 of the blades to increase the accuracy of seating. Each blade 32 and 33 is secured in its blade slot 24 or 25 by a screw 60 that extends into a screw-receiving opening 61 (Figs. 1 and 4) in the blade holder 20 or 21. Each hole 61 is inclined to the side wall 28 of the blade slots and inwardly toward the cutter axis and rearwardly of the direction of rotation of the cutter. When the blades 32 and 33 are positioned in the slots of the respective ring members 20 and 21, and the screws 60 are tightened up, then, the blades are drawn, because of the inclination of the screws 60, in three directions, namely, downwardly against the peripheral cylindrical seating surfaces 65 and 67 of the body members, rearwardly against the rear surfaces 26 of the blade slots 24 and 25 of the ring members 20 and 21, and axially, that is, laterally against the side walls 28 of these blade slots. Thus, the blades are pulled downwardly, rearwardly, and laterally into their seats, and are firmly held against cutting pressures. The result is that the blades will cut smoother, last longer, and can be sharpened more times without danger of breakage.

A cutter made according to the described embodiment of this invention is capable of extreme accuracy in manufacture. The body members 10 and 11 can be hardened; and the periphery of the hub 14 of part 10 and the bore 13 of part 11 can be ground as can also the contacting plane surfaces of parts 10 and 11. By making the blade holders 20 and 21 as separate parts from the body members, the desired accuracy is secured while manufacture is simplified. This makes it easier to grind the bottoms and sides of the blade slots. The bottoms are ground simply as cylindrical peripheral surfaces 65 and 67 on body members 10 and 11, while the sides 26 and 28 of a slot are ground simultaneously in either ring member 20 or 21 with side and tip surfaces of a suitably shaped grinding wheel whose axis may be inclined during grinding to a plane perpendicular to the axis of the ring member 20 or 21, as the case may be. Thus, the sides 26 of the slots may be ground with a conical side surface of the wheel, while the sides 28 may be ground with the conical peripheral surface of the wheel. Since the sides 27 of the slots are not required for holding the blades, they need not be ground at all. By making the ring members separate from the body members, the grinding wheel has plenty of clearance in grinding the blade slots.

In assembling the cutter together the body members 10 and 11 may be bolted together by bolts 15. Then the ring members 20 and 21 may be secured to the body members 10 and 11, respectively, by screws 22 and 23 with the lands 30 of ring member 20 positioned opposite the blade slots 25 of the ring member 21, and the lands 31 of ring member 21 positioned opposite the slots 24 of ring member 20. Then the blades 32 and 33 are placed in the slots 24 and 25, respectively, of the two ring members and secured therein by the screws 60. Thus, the blades are firmly held against the peripheral surfaces 65 and 67 of the body members 10 and 11 and against the backs 26 and sides 28 of the blade slots. When the cutter is used, then, radial cutting thrusts will be taken by the seating surfaces 65 and 67 while backward and axial cutting thrusts will be taken by the surfaces 26 and 28, respectively.

In the cutter shown the blades 32 and 33, as described, are opposite side-cutting blades of opposite hand. Because the lands of the one ring member 20 or 21 are positioned opposite the blade slots 25 or 24 of the other ring member, the opposite side cutting blades 32 and 33 of the cutter alternate with each other. Many more blades, in fact, approximately twice as many blades can, therefore, be mounted in a cutter made according to this invention, as in cutters of previous designs. It will be noted, as shown in Fig. 2, that the blades 32 and 33 of the cutter are made of such point-width that when the cutter is assembled together the blades will overlap laterally. Moreover, even though the cutter be of the type in which the blades should vary progressively in height around the periphery of the cutter, the blades are arranged in pairs so that the two blades of a pair are of the same height. This insures that smooth bottoms will be cut in the tooth spaces of a gear blank. The assembled point-width of the two successive blades of a pair of blades is the point-width desired to be cut. The radially converging surfaces 43 and 44 of the blades allow the cutter to be assembled without interference between the blades. An assembled cutter may be bolted to the cutter spindle of the gear cutting machine by bolts 70.

The "front" and "rear" walls of a blade slot or of a blade as herein described or as claimed hereinafter refer, of course, as usual in this art, to the front and rear walls, respectively, considered in the direction of rotation of the cutter. Likewise, the side wall of a blade or slot refers to a lateral wall of the blade or slot as distinguished from the front and rear walls thereof. Also, "inwardly" means inwardly radially of the axis of the cutter.

While the invention has been described in connection with a preferred embodiment thereof, it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A rotary gear cutter comprising two disc members of equal diameter which have cylindrical peripheral seating surfaces, a pair of ring members, one of which is secured to each disc to project radially therebeyond, said ring members being formed on their opposed faces with circularly arranged alternate slots and lands each of which extends generally radially of the axis of the cutter, the lands of one ring member being disposed opposite the slots of the other, a plurality of blades mounted in the slots of each ring member with their cutting portions projecting radially beyond the periphery of that ring member and with their bottoms seating against the periphery of the disc associated with that ring member, the blades mounted in the two ring members having, respectively, opposite side-cutting edges disposed at opposite sides for cutting, respectively, opposite sides of a gear tooth space, and having lateral overlap, and screws for securing the blades in said slots, each screw extending inwardly and rearwardly of the slot in which the blade is mounted and being inclined also to the side wall of the slot, and means securing the two disc members together to rotate as a unit.

2. A rotary gear cutter comprising two disc members which have cylindrical peripheral seating surfaces, one of said members being provided with a central conical bore and the other with a central conical hub that seats in said bore, a pair of ring members, one of which is secured to each disc to project radially therebeyond, said ring members being formed on their opposed faces with circularly arranged alternate slots and lands, the lands of one ring member being disposed opposite the slots of the other ring member, a plurality of blades mounted in the slots of the two ring members with their cutting portions projecting radially beyond the peripheries of the ring members and with their bottoms seating against the peripheries of the discs, means for securing the discs together, and means for securing each blade in its slot, the cutting portions of the blades of the two ring members overlapping laterally, and the blades which are secured in the two ring members having, respectively, opposite side cutting edges.

3. A rotary gear cutter comprising two disc members which have cylindrical peripheral seating surfaces, one of said members being provided with a central conical bore and the other with a central conical hub that seats in said bore, a pair of ring members, one of which is secured to each disc to project radially therebeyond, said ring members being formed on their opposed faces with circularly arranged alternate slots and lands, the lands of one ring member being disposed opposite the slots of the other ring member, a plurality of blades mounted in the slots of the two ring members with their cutting portions projecting radially beyond the peripheries of the ring members and with their bottoms seating against the peripheries of the discs, the periphery of each disc constituting thereby the bottom of the slots of that disc, each said slot having also a rear and a side wall, means for securing the discs together, and a screw for securing each blade in its slot, each screw being threaded into the blade and mounted in its ring so as to be inclined at other than right angles to the rear, side and bottom walls of the slot in which the blade seats.

4. A rotary gear cutter of disc form comprising a rotary head having a plurality of slots extending generally radially of the axis of the head, each slot having a rear wall lying in a plane parallel to the axis of the cutter and a bottom wall generally perpendicular to its rear wall and a side wall also generally perpendicular to its rear wall, a cutting blade mounted in each slot with its cutting portion projecting radially beyond the periphery of said head, and a plurality of screws in said head, each screw securing a blade in a slot, each screw being inclined to the rear, side, and bottom walls of the slot with which it is associated to draw the blade, which is mounted in that slot, against the rear, side and bottom walls of that slot simultaneously when the screw is tightened.

5. A gear cutter comprising a rotary head having a blade slot formed therein which has rear, side and bottom walls, the side and bottom walls being perpendicular to one another and the rear and bottom walls being perpendicular to one another, a removable blade mounted in said slot and having a shank portion which is rectangular in cross-section and which has outside, inside, front, rear and bottom faces, said shank portion having a screw-receiving opening therethrough which extends rearwardly from its outside face to its inside face, said head having a screw-receiving opening axially aligned with the opening in said shank portion, and a screw in said openings for securing said blade in said slot, said openings being inclined at other than right angles to both the rear wall of the slot and to one of the walls which is perpendicular thereto whereby when said screw is tightened the blade is seated firmly against the two said perpendicular walls.

6. A gear cutter comprising a rotary head having a blade slot formed therein which has rear, side and bottom walls, the side and bottom walls being perpendicular to one another and the rear and bottom walls being perpendicular to one another, a removable blade mounted in said slot, said blade having a cutting portion at its upper end and a shank portion at its lower end, said shank portion being rectangular in cross-section and having outside, inside, front, rear and bottom faces, said shank also having a screw-receiving opening therethrough that is inclined rearwardly and downwardly from its outside face to its inside face, said head having a screw-receiving opening axially aligned with the opening in said shank, and a screw in said openings for securing said blade in said slot, said openings being inclined diagonally both to the rear wall and to the bottom wall of the slot whereby when said screw is tightened the blade is seated firmly against said rear and bottom walls of said slot.

7. A rotary gear cutter comprising a disc having a cylindrical periphery, a ring member secured to one side of said disc to project radially therebeyond, said ring member having alternate slots and lands around its periphery which extend generally radially of the axis of the cutter, a plurality of blades each of which has a cutting portion and a shank portion, each blade and shank being mounted in a different one of said slots with its cutting portion projecting radially beyond the periphery of the ring and with the bottom of its shank portion seated against the periphery of the disc, the shank portion having a screw-receiving opening and the ring having an axially aligned screw-receiving opening, a headed screw in said aligned openings and threaded to one of them for forcing the shank into its slot, the screw being inclined at other than right angles to the rear and side surfaces of the slot and to the periphery of the ring against which the shank seats.

8. A rotary gear cutter comprising a rotary head having a plurality of circularly-arranged slots formed therein, a blade mounted in each of said slots, a corresponding number of screws in said head for securing the blades in their respective slots, each of said slots having a rear wall and a side wall, and the head and each blade having axially aligned openings receiving the screw which secures the blade, the aligned openings for each screw extending in a direction transverse of the blade and inclined at other than right angles to both the rear and side walls of the slot for the blade to force the latter simultaneously against both the rear wall and the side wall of its slot when the screw is tightened.

9. A rotary gear cutter comprising a rotary head having a plurality of circularly-arranged slots formed therein, a blade mounted in each of said slots, a corresponding number of screws in said head for securing the blades in their respective slots, each of said slots having a rear wall, a side wall and a bottom wall, and the head and each blade having axially aligned openings receiving the screw which secures the blade, the aligned openings for each screw extending in a direction transverse of the blade and inclined at other than right angles to the rear, side, and bottom walls of the slot for the blade to force the latter simultaneously against the rear, side and bottom walls of the slot when the screw is tightened.

10. A rotary gear cutter of disc form comprising a rotary head having a plurality of slots extending generally radially of the axis of the head, each slot having a rear wall lying in a plane parallel to the axis of the cutter and a bottom wall generally perpendicular to its rear wall, a cutting blade mounted in each slot with its cutting portion projecting radially beyond the periphery of said head, and a plurality of screws in said head, each screw securing one blade in a slot, the head and each blade having axially aligned openings which receive the screw for the blade, said aligned openings extending in a direction transverse of the blade and inclined to both the rear and the bottom wall of the slot for the blade to draw the latter simultaneously against both the rear and bottom walls of the slot when the screw is tightened.

11. A cutter blade for a rotary cutter of generally disc form, said blade having a shank portion and an integral cutting portion at the upper end of the shank portion, the shank portion having the rear, inside and bottom faces thereof generally perpendicular to each other and adapted for seating upon a cutter body, and the shank portion having a screw-receiving opening extending between the front and rear faces thereof for a screw to secure the blade to such cutter body, said opening inclining forwardly and upwardly from the inside face to thereby extend at an angle, other than a right angle, with respect to each of said rear, inside and bottom faces.

OLIVER F. BAUER.

References Cited in the file of this patent

UNITED STATES PATENTS

| Number | Name | Date |
|---|---|---|
| 205,296 | Peer | June 25, 1878 |
| 707,035 | Tindel | Aug. 12, 1902 |
| 959,104 | Barker | May 24, 1910 |
| 1,068,361 | Olver | July 22, 1913 |
| 1,411,390 | Tibbetts | Apr. 4, 1922 |
| 1,411,799 | Miller | Apr. 4, 1922 |
| 1,679,636 | Stonebraker | Aug. 7, 1928 |
| 1,714,700 | Stull | May 28, 1929 |
| 1,730,399 | Wetmore | Oct. 8, 1929 |
| 1,899,023 | Earl | Feb. 28, 1933 |
| 1,914,411 | Earl | June 20, 1933 |
| 1,971,428 | Riordan | Aug. 28, 1934 |
| 2,267,181 | Wildhaber | Dec. 23, 1941 |
| 2,230,662 | Whitman | Feb. 4, 1941 |
| 2,315,147 | Wildhaber | Mar. 30, 1943 |
| 2,376,465 | Wildhaber | May 22, 1945 |
| 2,392,278 | Wildhaber | Jan. 1, 1946 |
| 2,524,301 | Bauer | Oct. 3, 1950 |